Feb. 12, 1924.
L. FLESCH
BEARING
Filed June 1, 1921
1,483,170
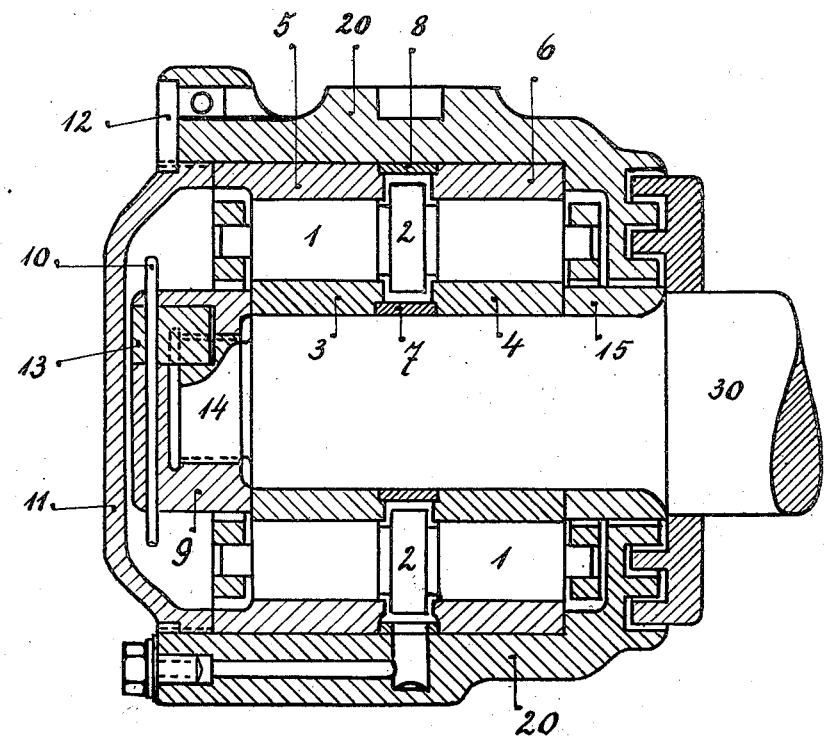
Inventor:
Leo Flesch.

Patented Feb. 12, 1924.

1,483,170

UNITED STATES PATENT OFFICE.

LEO FLESCH, OF ELBERFELD, GERMANY, ASSIGNOR TO THE FIRM G. & J. JAEGER, KOMMANDITGESELLSCHAFT, OF ELBERFELD, GERMANY.

BEARING.

Application filed June 1, 1921. Serial No. 474,212.

(GRANTED UNDER THE PROVISIONS OF THE ACT OF MARCH 3, 1921, 41 STAT. L., 1313.)

*To all whom it may concern:*

Be it known that I, LEO FLESCH, a citizen of the German Empire, residing at Elberfeld, Germany, have invented certain new and useful Improvements in Bearings, (for which I have filed applications in Germany, October 11, 1913, No. 292,-131; Holland, June 9, 1917, No. 2011; Austria, February 24, 1916, No. 71827; Belgium, December 31, 1915, No. 270740; Hungary, November 22, 1916, No. 69414; Switzerland, October 10, 1914, No. 69527; Sweden, July 19, 1919, No. 50468; Denmark, December 17, 1919, No. 27345; Norway, December 20, 1919, No. 32178; France, May 14, 1920, No. 515462; England, June 16, 1920, No. 145080; Italy, July 6, 1920, No. Reg. 292, No. 32), of which the following is a specification.

My invention refers to bearings and more especially to roller bearings and its particular object is to provide a bearing of this kind presenting special facilities regarding the mounting and adjusting.

In order to enable the rollers in roller bearings to take up not only radial, but also axial pressure, collars have been provided thereon. In the bearing according to the present invention such collars are provided on the middle portions of the rollers and the collars are made to revolve intermediate adjustable sleeves or within corresponding annular grooves disposed in the brasses.

In the drawings affixed to this specification and forming part thereof a bearing embodying my invention is illustrated by way of example, the figure being an axial section.

Referring to the drawings, 20, 20 are the brasses and 1, 1 are the rollers. Each roller has a collar 2 formed on its middle portion, inner bushings 3, 4 and outer bushings 5, 6 enclosing the rollers between them. The bushings of each pair are separated by spacer rings 7 and 8 respectively so that annular grooves are formed which form guides for the collars. A ring 15 surrounding the base portion of the journal 30 serves as an abutment for the inner bushings 3, 4, which are firmly pressed against ring 7 by a threaded nut 9 screwed onto the journal pin 14. The nut on the end of the shaft is locked by means of a cotter pin 10 which extends through a hole or passage provided in the nut and through a metal plug 13 which engages the end of the shaft and the nut. A hole is bored in the end of the shaft, and plug 13 is inserted in this hole. The outer bushings 5, 6 are pressed against ring 8 by the cover plate 11 screwed from without into the brasses, a key 12 serving to secure the cover plate against loosening.

The nut 9 and the cover plate 11 being independent one from the other are capable of transmitting axial displacing stresses arising between the brasses and the axle onto the collars 2. Any wear arising at the collars 2 or the bushings 3, 4 and 5, 6, respectively, can be remedied by remitting or replacing the rings 7, 8, the inner and outer bushings, owing to the independency of the nut 9 and cover plate 11, being capable of separate adjustment.

The novel bearing can be mounted from one side between stationary brasses and a stationary axle, this being of special importance in connection with axle bearings. It may be inserted in assembled condition in the brasses from one side of the axle and can be removed in a like manner, if necessary.

I claim:

1. In a bearing in combination, a brass, a plurality of rollers axially disposed in said brass for taking radial thrust, a collar on each roller for taking end thrust, inner and outer pairs of bushings enclosing said rollers, a spacer ring between the bushings of each pair surrounding said collars and means for pressing said bushings against said ring, said collars being out of contact with said spacer rings.

2. In a bearing in combination, a brass, a plurality of rollers axially disposed in said brass for taking radial thrust, a collar on each roller for taking end thrust, inner and outer pairs of bushings enclosing said rollers, a spacer ring between the bushings of each pair surrounding said collars and separate means for pressing said inner and outer bushings against said spacer rings, respectively, said collars being out of contact with said spacer rings.

3. A bearing comprising an outer casing or brass, a plurality of rollers axially disposed in said casing for transmitting radial thrust, a collar on each of said rollers for transmitting axial loads, a pair of inner bushings for transmitting radial and axial loads to said rollers, spacing means between said inner bushings, means for clamping said bushings against said spacing means, and outer bushings between said rollers and said casing, said collars extending between said inner bushings but not into contact with said spacing means.

4. A bearing comprising an outer casing, or brass, a plurality of rollers axially disposed in said casing for transmitting radial thrust, a collar on each of said rollers intermediate the ends thereof for transmitting axial loads, a pair of inner bushings for transmitting radial and axial loads to said rollers, spacing means between said inner bushings, means for clamping said bushings against said spacing means, a pair of outer bushings, spacing means between said outer bushings, and means for clamping said outer bushings against said spacing means, said collars extending between said bushings, but not into contact with said spacing means.

5. A bearing comprising an outer casing, a plurality of rollers axially disposed with respect to said casing for transmitting radial thrust, a collar on each of said rollers intermediate the ends thereof for transmitting axial loads, a pair of inner bushings mounted on a shaft, spacing means between said inner bushings, means on the end of said shaft for clamping said inner bushings and spacing means, a pair of outer bushings between said rollers and said outer casing, spacing means between said outer bushings, and means on the end of said outer casing for clamping said outer bushings and spacing means, said collars extending between said bushings but not into contact with said spacing means.

6. A bearing comprising an outer casing, a plurality of rollers axially disposed with respect to said casing for transmitting radial thrust, a collar on each of said rollers disposed intermediate the ends thereof, a pair of inner bushings disposed on each side of said collars, and adapted to transmit radial and axial loads to said collars, the axial loads being transmitted to said collars by the ends of said bushings adjacent said collars, spacing means between said bushings, means for clamping said bushings in position, a pair of outer bushings disposed on each side of said collars and adapted to take up radial and axial loads, spacing means between said outer bushings and means associated with said casing for clamping said outer bushings and spacing means, said collars extending between said bushings but not into contact with said spacing means.

In testimony whereof I affix my signature.

LEO FLESCH.